No. 841,703. PATENTED JAN. 22, 1907.
S. W. MILLER.
PISTON.
APPLICATION FILED JULY 9, 1906.

Witnesses
Benj. Finckel
Alice B. Cook.

Inventor
Samuel W. Miller
By Finckel & Finckel
his Attorneys

UNITED STATES PATENT OFFICE.

SAMUEL W. MILLER, OF PHILADELPHIA, PENNSYLVANIA.

PISTON.

No. 841,703.     Specification of Letters Patent.     Patented Jan. 22, 1907.

Application filed July 9, 1906. Serial No. 325,241.

*To all whom it may concern:*

Be it known that I, SAMUEL W. MILLER, a citizen of the United States, residing at Philadelphia, in the county of Philadelphia and State of Pennsylvania, have invented a certain new and useful Improvement in Pistons, of which the following is a specification.

The object of this invention is to simplify and cheapen the construction of piston-heads. The invention consists of the construction hereinafter described and claimed.

Figure 3:
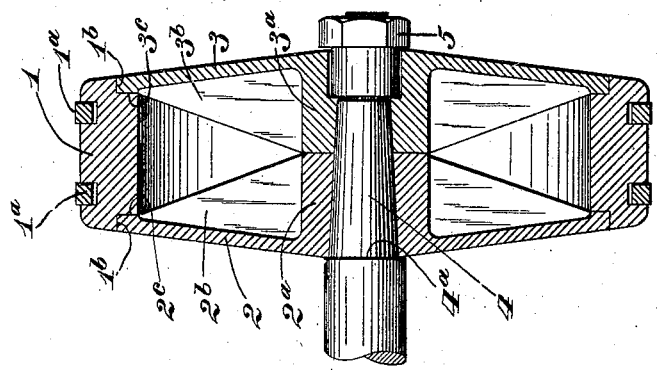
Figure 2:
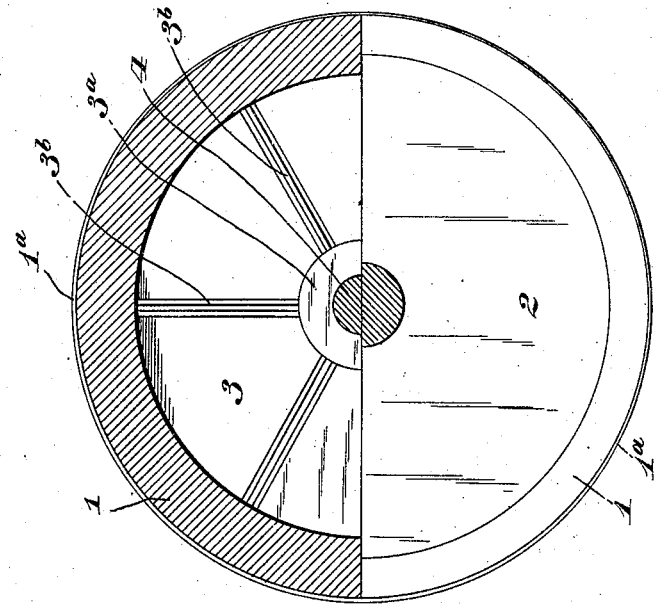
Figure 1:
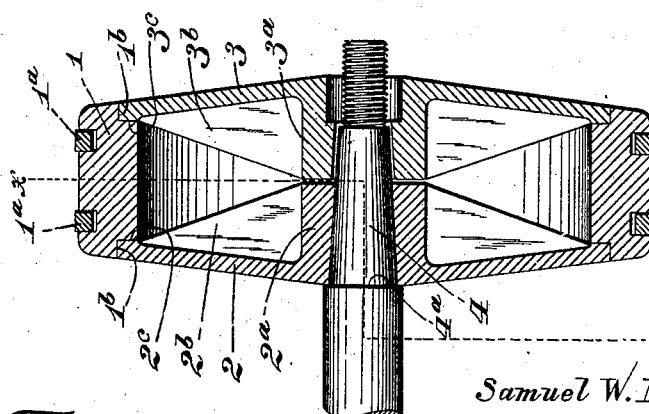

In the accompanying drawings, in which I have illustrated one embodiment of the invention, Figure 1 is a diametrical sectional view of the head on the rod, but before it is secured thereto. Fig. 2 is a sectional and elevational view looking from a plane $xx$, Fig. 1; and Fig. 3 is a diametrical sectional view of the head on the rod and secured thereto.

In the views, 1 designates the bull-ring, which has the usual packing-rings $1^a$. The inner corners of the bull-ring are cut away to form angular rabbet-like seats $1^b$.

2 designates what I shall denominate the "inner" plate, and 3 the outer plate. The plates are cast with hubs $2^a$ and $3^a$, respectively, and are ribbed, as seen at $2^b$ and $3^b$, respectively. The edges or rims of the plates are cut to form angular edges $2^c$ and $3^c$, corresponding to the seats $1^b$ in the opposite sides of the bull-ring.

4 designates the end of the piston-rod, which is tapered from a shoulder $4^a$ to form a seat for corresponding openings in the hubs of the plates 2 and 3. The extreme end of the piston is threaded to receive a locking-nut 5.

My method, which can be varied, of manufacturing the piston-head is as follows: The plates 2 and 3 are faced off at the adjacent ends of their hubs. The plates are then bolted together to a lathe face-plate and the taper fit for the piston-rod bored in both at the same time. They are then placed on a taper mandrel and drawn together by a nut like that designated 5, and the angular corners at the rims turned. When the rims of the plate are thus turned, the plates are left of a trifle larger diameter than the corresponding dimension of the seats in the bull-ring, so that the latter when heated and put in place will make a tight fit. When the seats for the plates in the bull-ring are cut, the distance between said seats is made such that when the plates are seated in the bull-ring a small space is left between the adjacent faces of the hubs of the plates, as depicted in Fig. 1, so that it shall require some pressure of the securing-nut to draw the hubs together and seat the outer plate on the taper of the piston-rod, as seen in Fig. 3.

It will be observed that the piston-head proper is made of three pieces only and that these pieces are easily cast and shaped to the required form. The disadvantages of shifting cores, as where a head is made solid or in one piece, are avoided. When worn, the bull-ring can be replaced with another, and therefore without loss of the side plates.

What I claim, and desire to secure by Letters Patent, is—

1. A piston-head comprising the two side plates, in combination with an integral bull-ring, the bull-ring being rabbeted at its inner corners to receive the edges of the side plates.

2. A piston-head comprising the two side plates provided with tapering seating-openings, in combination with the bull-ring, the bull-ring being rabbeted to receive the edges of the side plates, and the side plates normally separated at their centers before application to the piston-rod and adapted to be sprung together when secured on the rod.

3. A piston-head comprising the two side plates each provided with a tapered opening, a bull-ring rabbeted to receive the edges of the side plates and the side plates normally separated at their centers before application to the piston-rod and adapted to be sprung together when secured on the rod, in combination with a rod having a taper seat on which the plates fit at their aforesaid openings and means for springing said plates together on the rods.

SAMUEL W. MILLER.

Witnesses:
   H. HUSK,
   F. J. SCHAEFER.